(12) United States Patent
Stewart (10) Patent No.: US 7,748,843 B2
(45) Date of Patent: Jul. 6, 2010

(54) WATCHBAND EYEGLASSES

(76) Inventor: Gary A. Stewart, 8429 Early Bud Way, Laurel, MD (US) 20723

( * ) Notice: Subject to any disclaimer, the term of this patent is extended or adjusted under 35 U.S.C. 154(b) by 0 days.

(21) Appl. No.: 12/380,906

(22) Filed: Mar. 5, 2009

(65) Prior Publication Data
US 2009/0225272 A1  Sep. 10, 2009

Related U.S. Application Data (60) Provisional application No. 61/068,141, filed on Mar. 5, 2008.

(51) Int. Cl.
*G02C 1/00* (2006.01)
(52) U.S. Cl. .................... 351/158; 351/65
(58) Field of Classification Search .......... 351/41, 351/63, 64, 65, 158
See application file for complete search history.

(56) References Cited

U.S. PATENT DOCUMENTS

| | | |
|---|---|---|
| 1,167,953 A | 1/1916 | Uhlemann |
| 1,622,724 A | 3/1927 | Kirk et al. |
| 1,632,906 A | 6/1927 | Lafevre |
| 1,936,319 A | 11/1933 | Windgate |
| 1,995,664 A | 3/1935 | Boyes |
| 2,098,513 A | 11/1937 | Nerney |
| 2,814,968 A | 12/1957 | Nixon |
| 3,144,127 A | 8/1964 | Fogel |
| 3,395,964 A | 8/1968 | Chartrese |
| 3,825,110 A | 7/1974 | Halbich et al. |
| 4,720,186 A | 1/1988 | Douillard |
| 4,865,186 A | 9/1989 | Gates |
| D308,752 S | 6/1990 | Hall |
| 4,951,811 A | 8/1990 | Lines |
| 4,960,208 A | 10/1990 | Tempke |
| 5,015,087 A | 5/1991 | Baratelli |
| 5,016,749 A | 5/1991 | Kaye et al. |
| 5,065,373 A * | 11/1991 | Alcantara Maia ........... 368/278 |
| D322,262 S | 12/1991 | Manus |
| 5,110,197 A | 5/1992 | Arad |
| D351,945 S | 11/1994 | Kopel |
| D379,263 S | 5/1997 | Sussman |
| 5,676,242 A | 10/1997 | Scott |
| 5,748,280 A | 5/1998 | Herman |
| 5,915,545 A | 6/1999 | Shackel et al. |
| 5,921,383 A | 7/1999 | Shefler et al. |
| 6,003,663 A | 12/1999 | Newcomer |
| 6,102,541 A | 8/2000 | Kuo |
| 6,164,452 A | 12/2000 | Ellis |
| D452,612 S | 1/2002 | Alexandroff |
| 7,117,990 B2 | 10/2006 | Sarif |
| 7,198,366 B2 | 4/2007 | Gao |
| 2006/0256278 A1 * | 11/2006 | Amioka ..................... 351/41 |

* cited by examiner

*Primary Examiner*—Huy K Mai
(74) *Attorney, Agent, or Firm*—Ober / Kaler; Royal W. Craig (57) ABSTRACT

Watchband eyeglasses including a combination of flexible Pince-Nez reading glasses that rest securely on the wearer's nose, and a wrist-worn case for housing the reading glasses when not in use. Various embodiments of the case are disclosed including: (1) a bracelet or, (2) a universal attachment for any existing metal, plastic or fabric watchband; or (3) a dual-function case that is itself also a watchband. In all such embodiments the case incorporates a unique storage compartment or sleeve that facilitates carrying of the eyeglasses at all times, to make them more accessible.

27 Claims, 9 Drawing Sheets

WATCHBAND EYEGLASSES

CROSS REFERENCE TO RELATED APPLICATIONS

This application claims the benefit of U.S. provisional application Ser. No. 61/068,141, filed 5 Mar. 2008, which is hereby incorporated by reference as if fully set forth herein.

BACKGROUND OF THE INVENTION

1. Field of the Invention

The present invention relates to eyeglasses and their cases, and more particularly, to a combination of flexible reading glasses and a wrist-worn case for housing the reading glasses when not in use.

2. Discussion of the Related Art

Many people today have vision problems that require correction. Toward this end, the eyeglass and contact lens industry has developed to include a wide variety of eyeglass types and styles. From as early as the 1300's, eyeglasses were made that clamped on the nose. This was done by rotating the lenses around a pivot on the bridge between the two lenses into firm contact with the nose. Beginning in the 1840's, the Pince-Nez ("nose-pinchers" in French) eyeglasses were first worn. These glasses consisted of lenses, cork nose guards and a spring bridge biasing of the lenses to clamp the nose. Later, in 1890, rimless eyeglasses were made by drilling holes in the glass lenses to hold the nose bridge and the temples to the lenses. The "rimless" innovation was added to the Pince-Nez eyeglasses to form a rimless Pince-Nez, although the metal spring bridge and nose guards remained.

In 1916, William R. Uhlemann invented an "eyeglass bridge or arch", formed of vitreous or transparent vitreous material such as glass, that is integrally connected to the eyeglass lenses (U.S. Pat. No. 1,167,953). In 1927, Percy Kirk and Sydney Mortimer Kirk invented improved mounts for connecting the bridges of rimless pince-nez glasses (U.S. Pat. No. 1,622,724) and Jules Lafevre invented lens clamping brackets for pince-nez glasses (U.S. Pat. No. 1,632,906). In 1937, George E. Nerney invented a frame for pince-nez eyeglasses known as an "Oxford" frame (U.S. Pat. No. 2,098,513) and in 1938, Joseph Pearson of England secured British Patent No. 490,197 for his invention of spectacles made in one piece of "artificial molded material" that is not glass, and comprising two lenses connected together by a connecting piece of the same material as that used for the lenses.

In 1991, Charles Baratelli invented one-piece, frameless pince-nez eyeglasses, made of new lightweight plastics, with a flexible bridge (U.S. Pat. No. 5,015,087) and Carl Manus invented adjustable and foldable reading pince-nez reading glasses (U.S. Pat. No. D 322,262).

Numerous cases and containers have been designed for storing eyeglasses and associated products such as a second pair of glasses, contact lens cases, etc. Although not exhaustive, the following list provides some useful background information:

| Pat. No. | Inventor | Description |
| --- | --- | --- |
| D 308,752 | Hall | Eyeglass case and utility pouch |
| D 351,945 | Kopel | Combined eyeglass cases and wallet |
| D 379,263 | Sussman | Case for eyeglasses and contact lenses |
| D 452,612 | Alexandroff | Zippered, flexible case for multiple pairs of eyeglasses |
| 1,995,664 | Boyes | Case with two separate compartments |
| 3,144,127 | Fogel | Two-in-one eyeglass case |
| 3,825,110 | Halbich et al | Hinged, molded hard plastic case |
| 4,865,186 | Gates | Case for eyeglasses and contact lenses |
| 4,951,811 | Lines | Combined eyeglass case, contact lens and accessories case |
| 4,960,208 | Tempke | Eyeglass case kit with folding flat |
| 5,016,749 | Kaye et al | Case for carrying eyeglasses and contact lenses |
| 5,676,242 | Scott | Case for eyeglasses and sunglasses |
| 5,915,545 | Shackel et al | Flexible style kit with fastener for eyeglass holder |
| 5,921,383 | Shefler et al | Rigid type eyeglass case with two shell members |
| 6,003,663 | Newcomer | Case with rigid internal member and flexible covering |
| 6,164,452 | Ellis | Personal optical care container |

A significant problem with reading glasses from the wearer's perspective is the tendency to lose or forget the glasses, and conventional eyeglass cases do nothing toward solving the problem. Indeed, they rather promote losing or forgetting both the eyeglasses and the case. It would be no great feat to design a more "user-attached" eyeglass case, except that eyeglasses are odd-shaped and typically require an elongated case, and users are conscious of their appearance and typically do not want a bulky or aesthetically unappealing appendage.

In an effort to provide more convenience for the eyeglass wearer, several disclosures are relevant. Arad (U.S. Pat. No. 5,110,197) describes an emergency eyeglass consisting of a flat, plate shaped body, which includes two optical lenses, integrally molded from plastics. Herman (U.S. Pat. No. 5,748,280) describes rimless eyeglasses having removable lenses, and Sarif (U.S. Pat. No. 7,117,990) describes a credit card-sized, modular set having a flexible stow envelope for receiving a companion nose-clasping (Pince-Nez) type reading glasses.

Folding eyeglasses make up the final category relevant to the invention. Windgate (U.S. Pat. No. 1,936,319), Nixon (U.S. Pat. No. 2,814,968), and Chartrese (U.S. Pat. No. 3,395,964) each disclose foldable eyeglasses. Perhaps the most relevant invention is that by Douillard (U.S. Pat. No. 4,720,186) which describes a pair of folding eyeglasses and watch carrying case in which the eyeglasses are stored in a carrying case beneath a pivotal watch movement.

Finally, and more recently, Kuo (U.S. Pat. No. 6,102,541) discloses eyeglasses, which are convertible into an eyeglass case, and Gao (U.S. Pat. No. 7,198,366) describes eyeglasses that can be folded to form a case using the temple bars.

None of these patents, however, suggests or discloses a convenient, universally attachable bracelet or eyeglass watchband case, or innovative design integral to the watchband itself for Pince-Nez style eyeglasses. The present invention approaches the problem both from the design of the case, as well as the eyeglasses themselves, and provides a combination of flexible Pince-Nez reading glasses that rest securely on the wearer's nose, and a wrist-worn case for housing the reading glasses when not in use. The case incorporates a unique storage compartment that easily facilitates carrying eyeglasses at all times, with such glasses functioning as spare or as an original pair. Due to the convenience, any individual can always carry a pair of glasses and eliminate the possibility of being caught without suitable vision aids.

SUMMARY OF THE INVENTION

Accordingly, the present invention is the combination of flexible bendable eyeglasses and a wrist-worn case incorporating a unique storage compartment.

An object of the present invention is to provide the flexible eyeglasses and wrist-worn case to facilitate more convenience and easier carrying of the eyeglasses at all times, so that any individual can always carry a pair of glasses and eliminate the possibility of being caught without suitable vision aids.

Another object is to provide the wrist worn case in the form of a watchband, a bracelet, or as a removable attachment to an existing watchband, bracelet or wrist strap.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. To achieve these objects and other advantages, watchband eyeglasses are disclosed including a combination of flexible Pince-Nez reading glasses that rest securely on the wearer's nose, and a wrist-worn case for housing the reading glasses when not in use.

Various embodiments of the case are disclosed including: (1) a bracelet or, (2) a universal attachment for any existing watchband (or other wristband); or (3) a dual-function case that is itself also a watchband.

The eyeglasses are preferably formed of a flexible resilient material and are adapted to flex lengthwise, for example, from a substantially horizontal lengthwise form to an arcuate lengthwise form. The wrist-worn case encloses and contains the flexible eyeglasses while in their flexed form. The wrist-worn case is either integral to or is adapted to attach to a band worn about a user's wrist, and in this regard various embodiments of the case are shown including (1) bracelet with integral case; (2) attachment for existing watchband or wristband; and (3) dual-function case that is also a watchband. In these embodiments the case generally includes an arcuate backplate conforming to said user's wrist, a pair of opposing sidewalls protruding from the backplate, and an arcuate cover pivotally engaged at one end of the sidewalls/backplate and pivotable against the sidewalls to form an arcuate enclosure between said backplate, sidewalls and cover. The flexible eyeglasses, preferably Pince-Nez reading glasses including a pair of lenses integrally formed with a flexible frame, may be stored within the enclosure in their arcuate lengthwise form. In the foregoing embodiments the case incorporates a unique storage compartment with pivoting latchable cover that facilitates carrying of the eyeglasses at all times, to make them more accessible. In other embodiments the case generally includes an open-ended envelope or sleeve formed lengthwise along the band and again conforming to said user's wrist. The flexible eyeglasses may be slid lengthwise into the envelope-case.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to preferred embodiments of the present invention, examples of which are illustrated in the accompanying drawings. Wherever possible, the same reference numbers will be used throughout the drawings to refer to the same or like parts. Hereinafter, watchband eyeglasses including a pair of flexible eyeglasses in combination with a wrist-worn case is disclosed.

Figure 1:
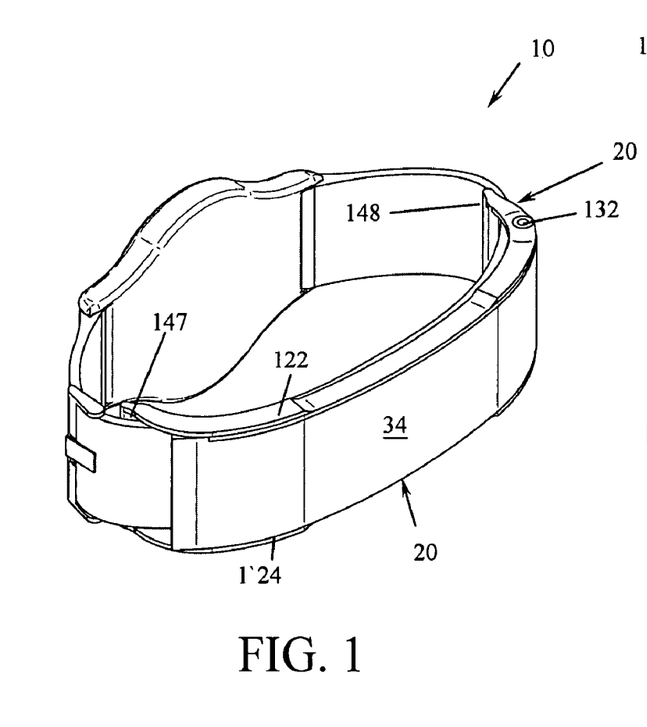
FIG. 1 is a rear perspective view of watchband eyeglasses according to a first embodiment of the invention.
Figure 2:
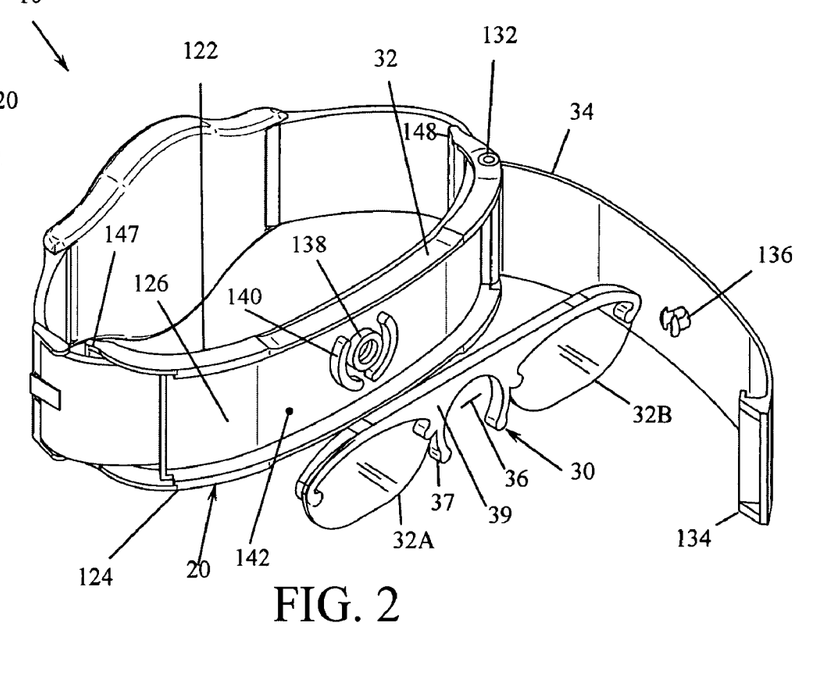
FIG. 2 is a rear perspective assembly drawing of the watchband eyeglasses according to FIG. 1.

FIG. 1 is a rear perspective view of the watchband eyeglasses 10 according to one embodiment of the present invention, and FIG. 2 is a rear perspective assembly drawing of the watchband eyeglasses 10 as in FIG. 1. As shown in FIG. 2, the watchband eyeglasses 10 include a combination of flexible Pince-Nez reading glasses 30 that rest securely on the wearer's nose, and a wrist-worn case 20 for housing the reading glasses 30 when not in use. The embodiment of FIGS. 1-2 is a retrofit case 20 that attaches to a conventional watchband (or other wrist-worn band). As described below, alternate versions of the wrist-worn case 20 may be provided as an integral feature of a bracelet, or as a dual-function combination watchband and case. In all such embodiments the case 20 incorporates a unique storage compartment that facilitates seating, secure containment, and protective enclosure of the eyeglasses in a compact configuration conforming to the user's wrist, thereby making the eyeglasses 20 more accessible to the user.

The flexible Pince-Nez reading glasses 30 include a resilient lengthwise-bendable plastic frame 39 containing two resilient plastic lenses 32A & 32B.

In addition to the eyeglasses 30, the wrist-worn case 20 is provided for housing the eyeglasses 30 when not in use. The embodiment shown in FIGS. 1-2 is a retrofit case 20 that attaches to most any conventional watchband. Other versions of the wrist-worn case include a bracelet or a dual-function embodiment that serves both purposes of a watchband and wrist-worn case. In all such embodiments the case 20 incorporates a unique storage compartment 142 that facilitates seating, secure containment, and protective enclosure of the eyeglasses 30 in a compact flexed configuration conforming to the user's wrist, thereby making the eyeglasses 30 more accessible to the user.

The illustrated wrist-worn case 20 comprises a backplate 126 bounded along each side by opposing side rails 122, 124. The wrist-worn case 20 including backplate 126 and side rails 122, 124 may be formed of a flexible material that provides a degree lengthwise flex allowing backplate 126 and side rails 122, 124 to be bent to an arcuate configuration conforming to the wrist. Alternatively, the wrist-worn case 20 including backplate 126 and side rails 122, 124 may be formed of a rigid material such as stainless steel, preformed in an arcuate configuration conforming to the wrist. For the latter, the backplate 126 is formed along a flattened partial arc, flattened to conform to the curvature of the wrist. For the former, the wrist-worn case 20 including backplate 126 and side rails 122, 124 flex lengthwise into the arcuate configuration when worn. The side-rails 122, 124 rise a few millimeters on each side and protrude past the backplate 126 at each end, extending outward to cross-beams 147, 148 and defining apertures between the cross-beams 147, 148 and the backplate 126. The cross-beams 147, 148 attach around the existing watchband, the band passing through the apertures. When the wearer applies the watchband, each end of each watchband strap is passed through a corresponding aperture occurring between the backplate 126 and cross-beams 147, 148, and the watchband is attached in the conventional manner behind the backplate 126 along with side-rails 122, 124 define a long shallow arcuate enclosure, which may be selectively closed over by an arcuate cover 34 that is pivoted at one end between the side-rails 122, 124 at a pivot pin 132. The cover 34 swings freely but locks closed against the backplate 126 via a latching mechanism. In the current embodiment, the latching mechanism is accomplished with two locking features: 1) a central detent prong 136 that fits within a raised receptacle 138 formed in the backplate 126, and 2) a distal underhook 134 that clamps around the far side of the backplate 126. The receptacle 138 is encircled by a pair of raised ribs 140 that serve as an eyeglass attachment anchor. Again, the eyeglasses 30 are formed with opposed bridges 37 that circumscribe a U-shaped, V-Shaped or semi-circular arc, and this arc snaps over the raised conforming (U-shaped, V-Shaped or semi-circular as shown) ribs 140. Thus, the eyeglass attachment ribs 140 center and hold the eyeglasses within the enclosure 142, centered therein, but substantially horizontal.

Figure 3:
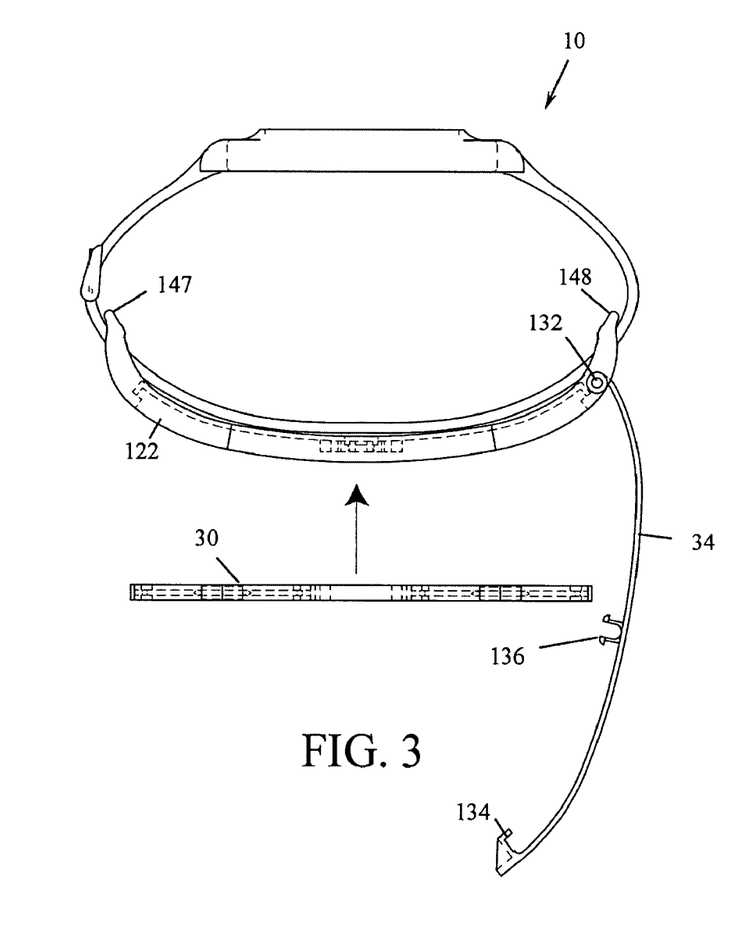
FIG. 3 is a side assembly drawing of the watchband eyeglasses as in FIG. 1.
Figure 4:
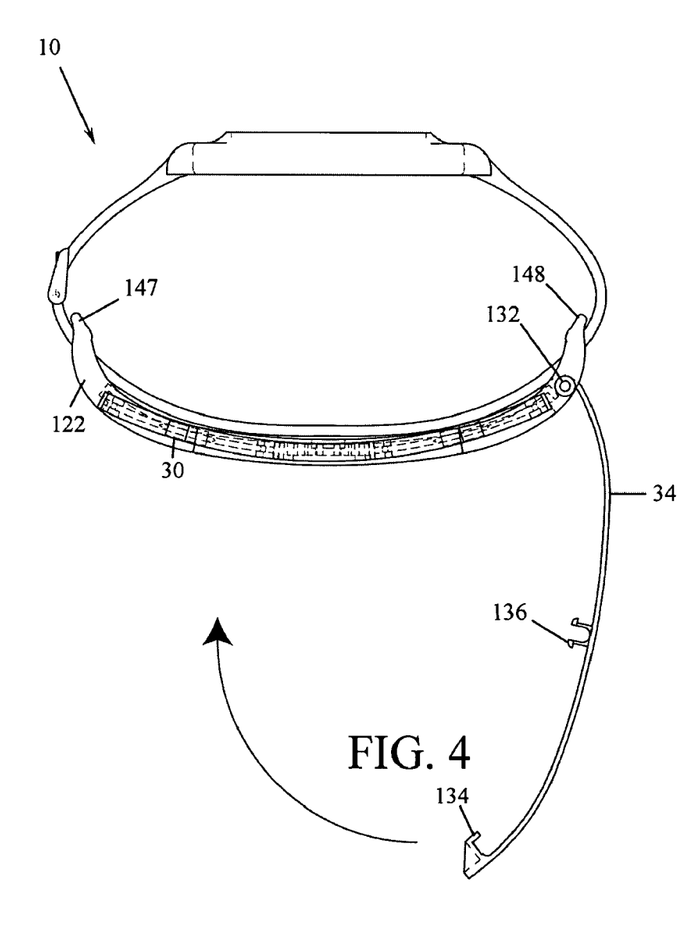
FIG. 4 is a side assembly drawing of the watchband eyeglasses as in FIG. 1.

FIGS. 3 and 4 are side assembly drawings of the watchband eyeglasses as in FIG. 1, illustrating their use. In use, to secure the eyeglasses 30 the user simply positions them centrally over the open enclosure 142 (cover 34 open as shown in FIG. 3) and snaps the resilient opposed bridges 37 over the raised conforming (U-shaped, V-Shaped or semi-circular) ribs 140 of the backplate 126, with the eyeglasses extending horizontally along the line of the open enclosure 142 formed in the backplate 126. As the cover 34 is pivoted closed as shown in FIG. 4, it gently presses the eyeglasses 30 into the enclosure 142, conforming the bendable eyeglasses 30 into the arc of the enclosure 142. Once fully seated therein, the cover 34 snaps shut and releasably locks in place, with the detent prong 136 secured in the wrist-worn case 20, and the underhook 134 latched about the distal end of the backplate 126.

Figure 5:
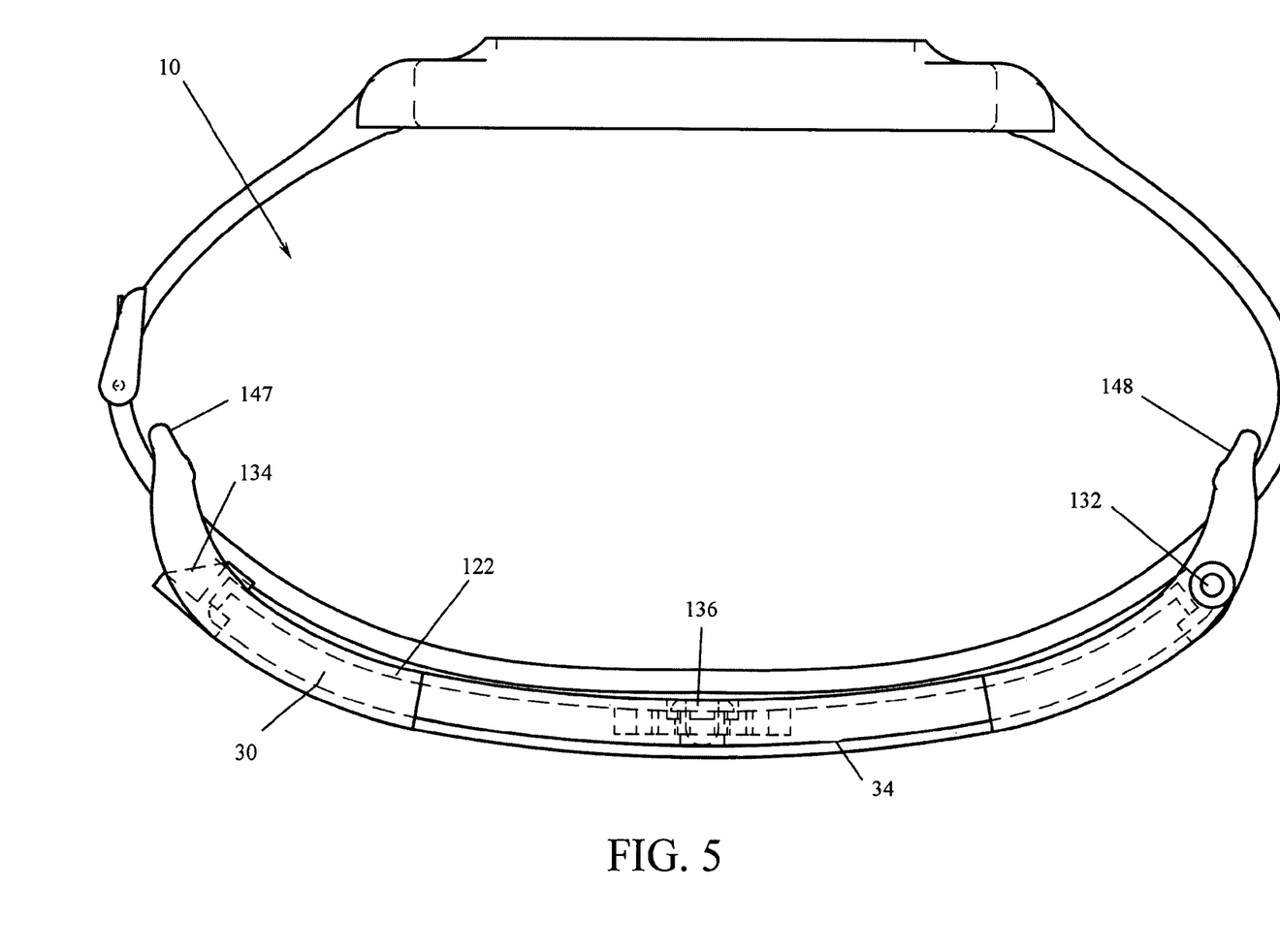
FIG. 5 is a side cross-section of the watchband eyeglasses as in FIG. 1.

FIG. 5 is a side cross-section of the watchband eyeglasses as in FIGS. 1-4 showing the cover 34 fully closed from the open position of FIG. 4. The eyeglasses 30 remain fully protected, fully enclosed, and yet easily accessible from within the wrist-worn case 20 simply by unlatching the cover 34 and removing the eyeglasses 30.

Figure 6:
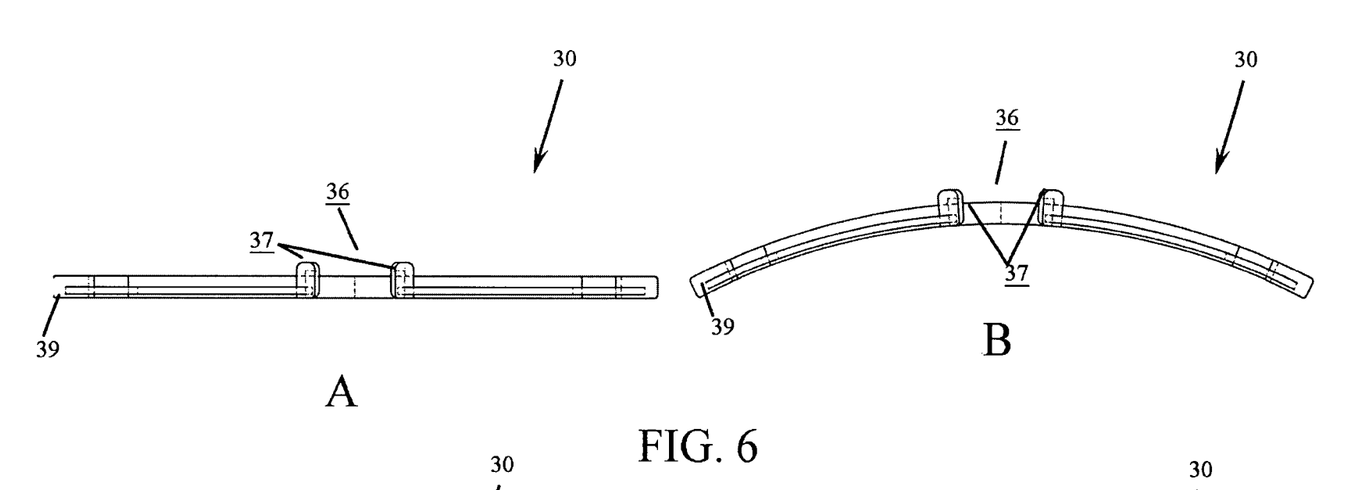
FIG. 6 is a composite top view of the flexible reading glasses 30 in a horizontal unflexed position (A) and flexed position (B).
Figure 7:
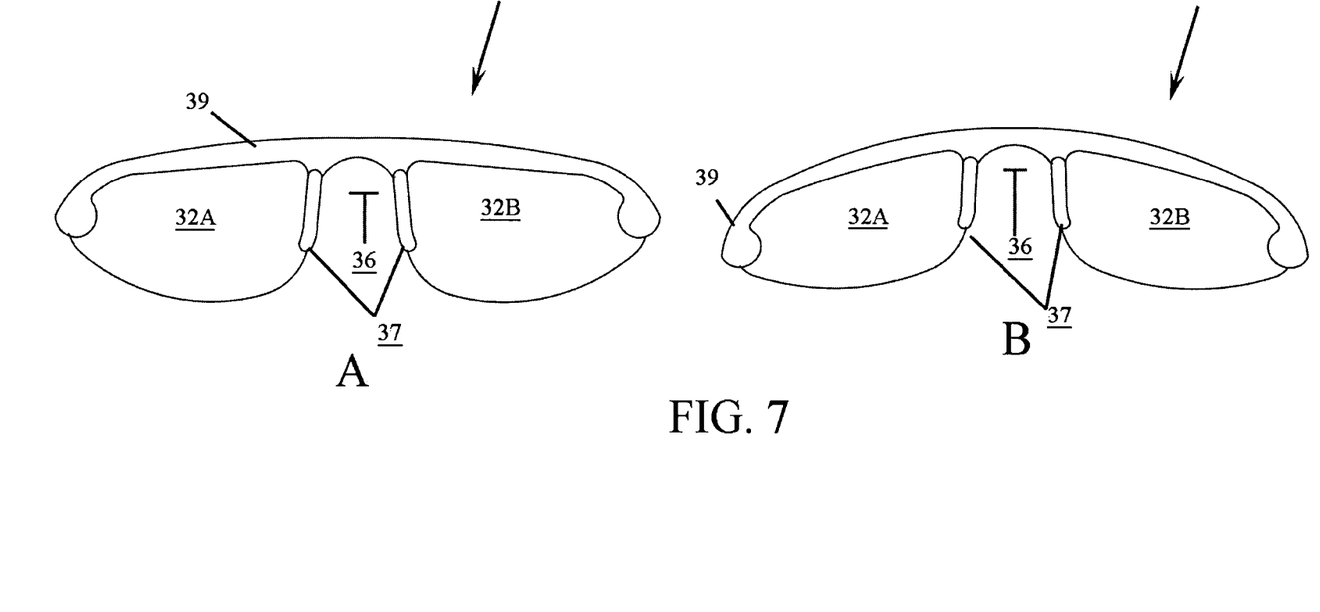
FIG. 7 is a composite front view of the flexible reading glasses 30 in a horizontal unflexed position (A) and flexed position (B).

FIGS. 6 and 7 are composite views of the flexible reading glasses 30 in a horizontal unflexed position (A) and flexed position (B). The flexible Pince-Nez reading glasses 30 include a resilient lengthwise-bendable plastic frame 39 containing two resilient plastic lenses 32A & 32B. In the presently-preferred embodiment, both frame 39 and lenses 32A & 32B are constructed in a known manner, such as by molding, into a unitary form of substantially thin, clear, flexible material. The frame 39 does not have ear supports, but does include a removed area defining a central nose bridge 36 for the nose of a wearer. Any known flexible material that is clear, thin and light in weight and provides the necessary flexibility, such as a mono layer of butyrate, cellulosic acetate, a light plastic, or the like, may be used to form the lenses 32A & 32B and frame 39. Alternatively, frame 39 may be separately made from other suitable materials that are thin and light in weight and provide the necessary flexibility, including titanium-based alloys such as Flexon™, a shape memory alloy by Marchon Eyewear.

The frame 39 and lenses 32A & 32B are preferably molded into a shape-memory preset flat shape, as shown in FIGS. 6(A) and 7(A), the molds also defining the optical properties of lens portions 32A, 32B. The frame 39 is slightly thicker for protection of the lenses. For example, assuming use of a clear flexible cellulose acetate butyrate, the finished product may have a 0.75 centimeter frame thickness and 0.5 centimeter lens thickness. It is undesirable to grind the lenses from blanks, or in any way require a lens generator to grind the appropriate optical curves. Instead, the eyeglass frames 39 (with lenses 32A, 32B integrally preformed) are simply molded and the molds define different magnification or prescription gradients. Alternately, the gradients may be achieved by molding flat non-magnification lenses and then applying retrofit lens attachments such as Optx 20/20™, available from Neoptx, Inc., of Redmond, Wash., 98052, which provides a removable reading lens which can be applied to a non-prescription lens. In this case the Optx 20/20™ lens is applied to the inside of the lens 32A, 32B surface with water and adheres by molecular attraction.

The frame 30 is cut slightly thicker than the lenses 32A, 32B to protect the lenses, and the thicker frame 30 is formed with an open bridge 36 that defines any of a V-shape, U-shape, semi-circular or square shape aperture. The bridge 36 is bounded by opposed nose pads 37 on either side. The nose pads 37 are formed with slightly broader flattened surfaces for support against the user's nose. The shape of the bridge 36 is not important. What is important is the shape-memory characteristic of the molded frame 30 at the bridge 36, and the angle/position of the opposed nose pads 37 inasmuch as it is desirable to secure the eyeglasses 30 by the nose pads 37 pinching lightly onto the nose. This way, the eyeglasses 30 rest securely and comfortably on the wearer's nose.

The overall dimensions of the eyeglasses 30 are also important because it is desirable to minimize the necessary storage space yet maintain a suitable field of view through the lenses. In the presently preferred embodiment the total width of the eyeglasses is 3.5-4" long, and approximately 1" high. The open bridge 36 aperture is medially approximately 0.5" across, and the opposing lenses are approximately 1.375" long by 0.75" high. This dimensional configuration when clipped medially on the nose yields a 10-15 degree field of vision, suitable for a full view of a book or computer screen positioned 1-3' in front of the user.

Figure 8:
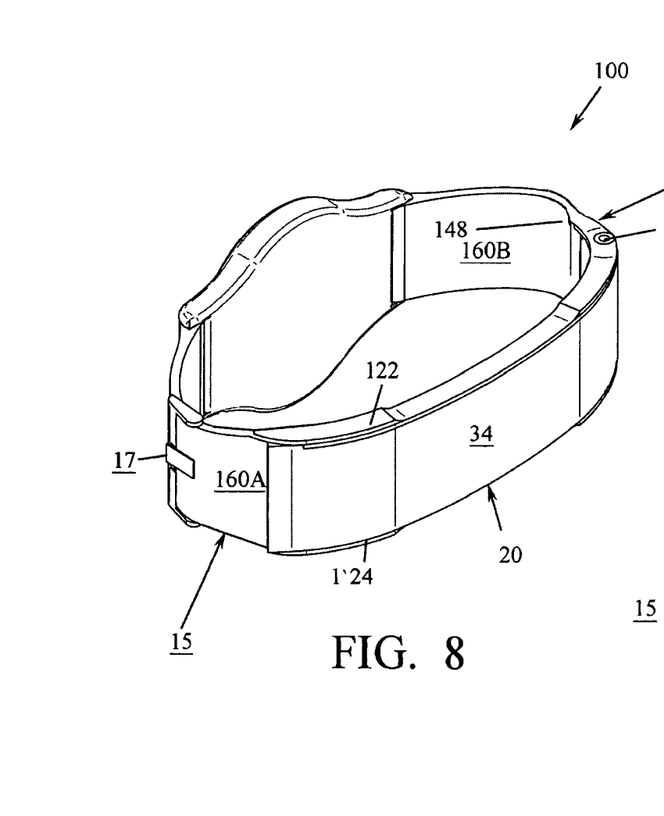
FIG. 8 is a rear perspective view of a dual-purpose watchband and eyeglasses with case 100 according to a second embodiment of the present invention.
Figure 9:
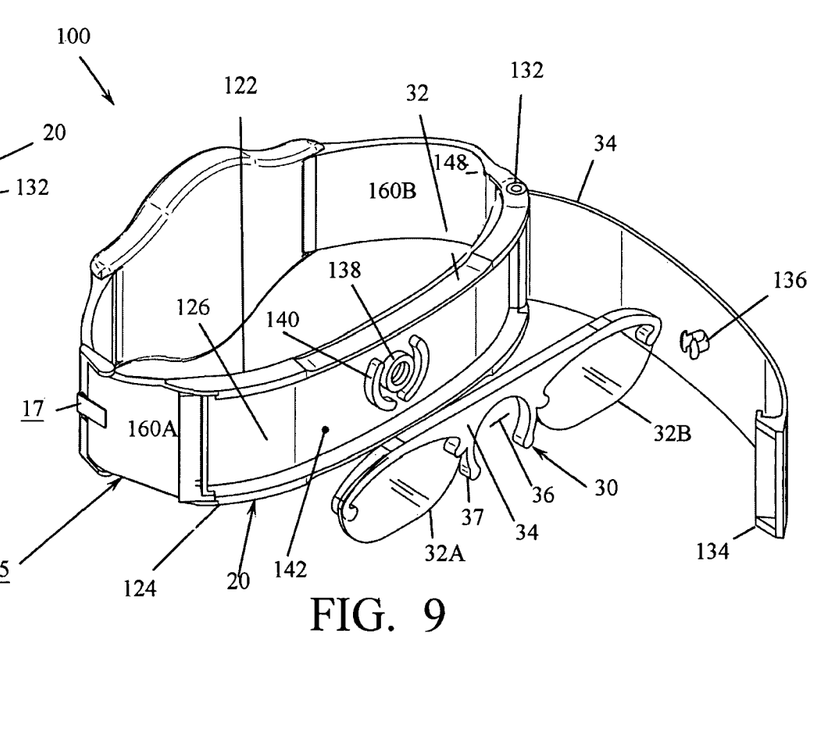
FIG. 9 is a rear perspective assembly drawing of the watchband eyeglasses 100 as in FIG. 8.

FIG. 8 is a rear perspective view of the watchband eyeglasses and case 100 according to a second embodiment of the present invention, and FIG. 9 is a rear perspective assembly drawing of the watchband eyeglasses and case 100 as in FIG. 8. In this embodiment the wrist-worn case 20 is dual-function, serving both as a watchband as well as containment for the eyeglasses 30. The case is integrally joined (e.g., by molding) with an otherwise conventional watchband 15, and opposing band sections are integrally joined to the case 20 at left and rightside unions 160A & 160B, effectively eliminating the cross-beams 147, 148 of FIGS. 1-5. The watchband 15 itself serves as the backplate 126 of FIGS. 1-5, and the sidewalls 122, 124 protrude directly from the watchband 15. Other like components common to FIGS. 1-5 are similarly numbered. In this embodiment, the entire wrist-worn case 20 and watchband 15 may be integrally molded of polyurethane (PU), the watchband 15 being separated in two sections joinable together at a buckle 17 positioned on either one of the left or rightside unions 160A & 160B. Again, the case 20 incorporates a unique storage compartment that facilitates seating, secure containment, and protective enclosure of the eyeglasses 30 in a curved configuration about the user's wrist, thereby making the eyeglasses 30 more accessible to the user.

Figure 10:
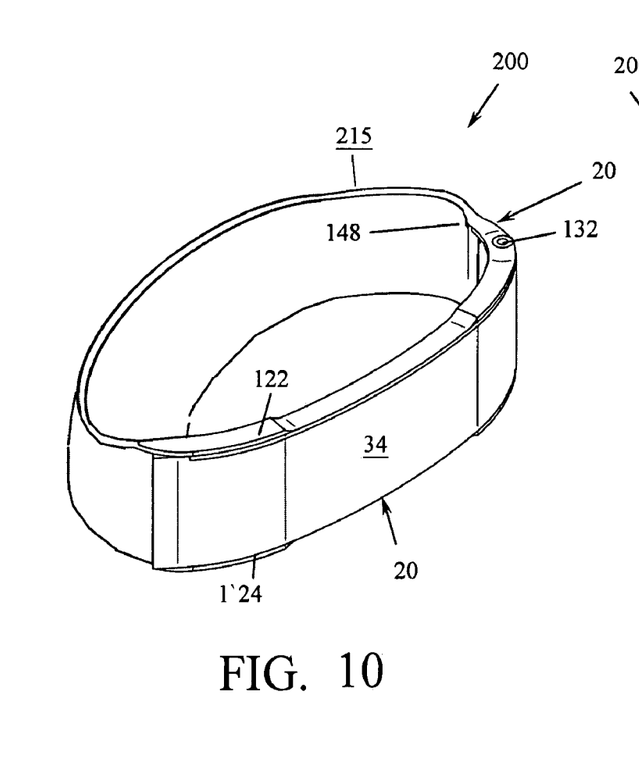
FIG. 10 is a rear perspective view of bracelet-style eyeglasses with case 200 according to a third embodiment of the present invention.
Figure 11:
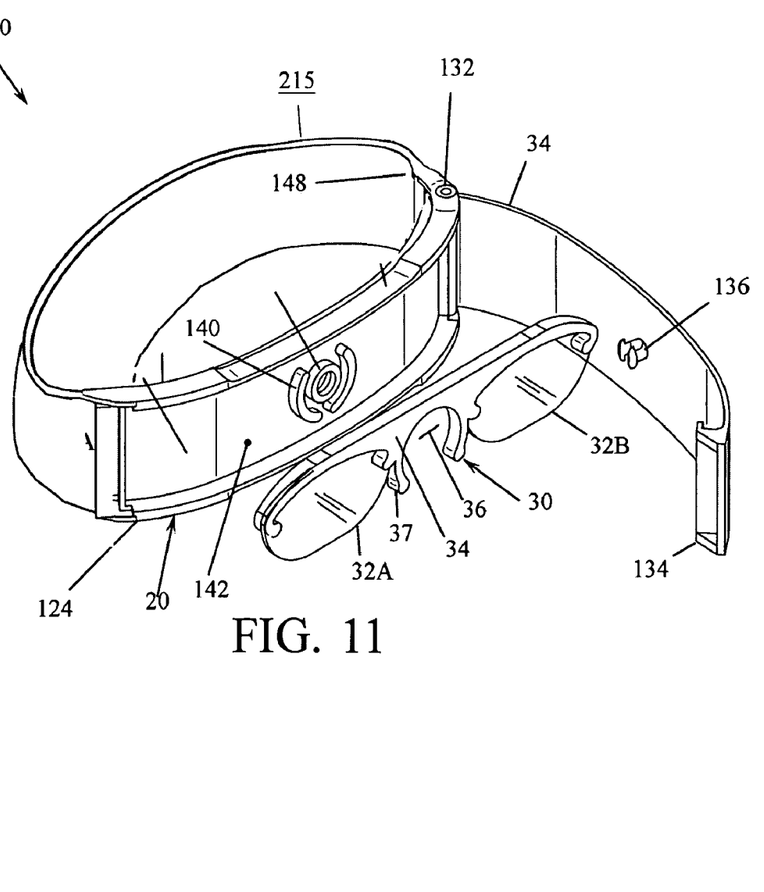
FIG. 11 is a rear perspective assembly drawing of the bracelet-style eyeglasses with case 200 as in FIG. 10.

FIG. 10 is a rear perspective view of eyeglasses with a bracelet-style case 200 according to a third embodiment of the present invention, and FIG. 11 is a rear perspective assembly drawing of the bracelet-style eyeglasses and case 200 as in FIG. 10.

In this embodiment the bracelet-style eyeglasses and case 200 include wrist-worn case 20 similar to that of FIGS. 8-9, but integrally joined with a bracelet 215 as opposed to a watchband 15. Like components common to FIGS. 1-7 are similarly numbered. In this embodiment, the entire bracelet 215 and bracelet-style case 20 may be formed of an aesthetically pleasing material such as stainless steel, platinum or other suitable materials. As before, the case 20 incorporates a storage compartment that facilitates seating, secure containment, and protective enclosure of the eyeglasses in a curved configuration about the user's wrist, again making the eyeglasses 30 more accessible to the user. The bracelet 215 simply eliminates the watch with an aesthetically pleasing more jewelry-oriented eyeglass holder.

In all three of the above-described embodiments, the invention provides a combination of flexible Pince-Nez reading glasses that rest securely on the wearer's nose, and a wrist-worn case for housing the reading glasses when not in use. The unique storage compartment integrated into the case facilitates carrying the eyeglasses at all times, with such glasses functioning as spare or as an original pair. Given such convenience, any individual can always carry a pair of glasses and eliminate the possibility of being caught without suitable vision aids.

Figure 12:
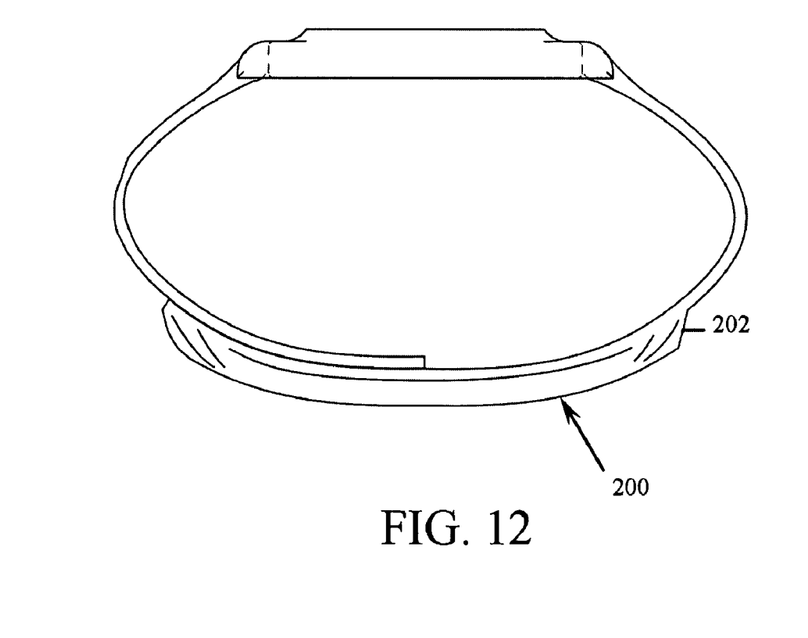
FIG. 12 is a side view of watchband eyeglasses incorporating an envelope case 200 according to another embodiment of the invention.
Figure 13:
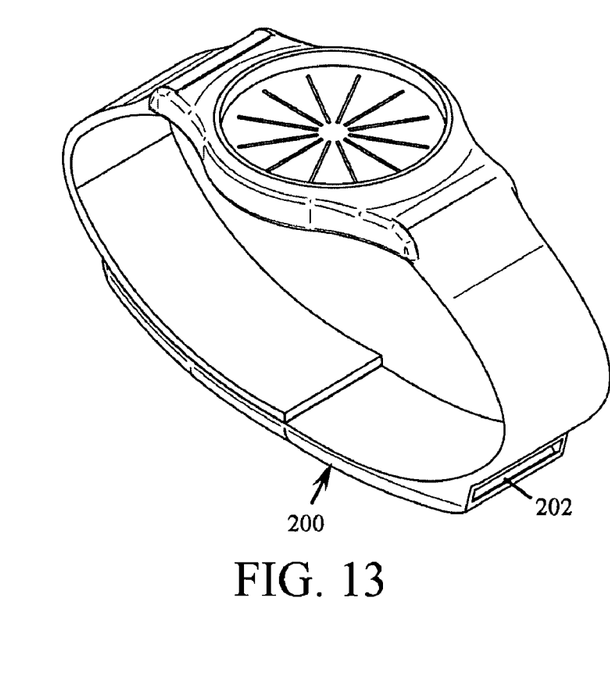
FIG. 13 is a perspective view of the watchband eyeglasses with envelope case 200 as in FIG. 12.

FIGS. 12-13 illustrate yet another embodiment of a combination watchband eyeglasses incorporating a slide-in envelope case 200. In this embodiment the wrist-worn case 200 is integrally-attached to one strap of a watchband, the case being integrally joined (e.g., by molding) with the otherwise conventional watchband. In this embodiment, the entire wrist-worn case 200 when worn defines a slightly-arcuate open-ended sleeve containing an elongate storage compartment with opening 202 at one end that facilitates seating, secure containment, and protective enclosure of the same eyeglasses 30. The strap of watchband bearing the wrist-worn case 200 simply attaches to the other opposing strap in any conventional manner to secure the watchband onto the user's wrist.

Figure 14:
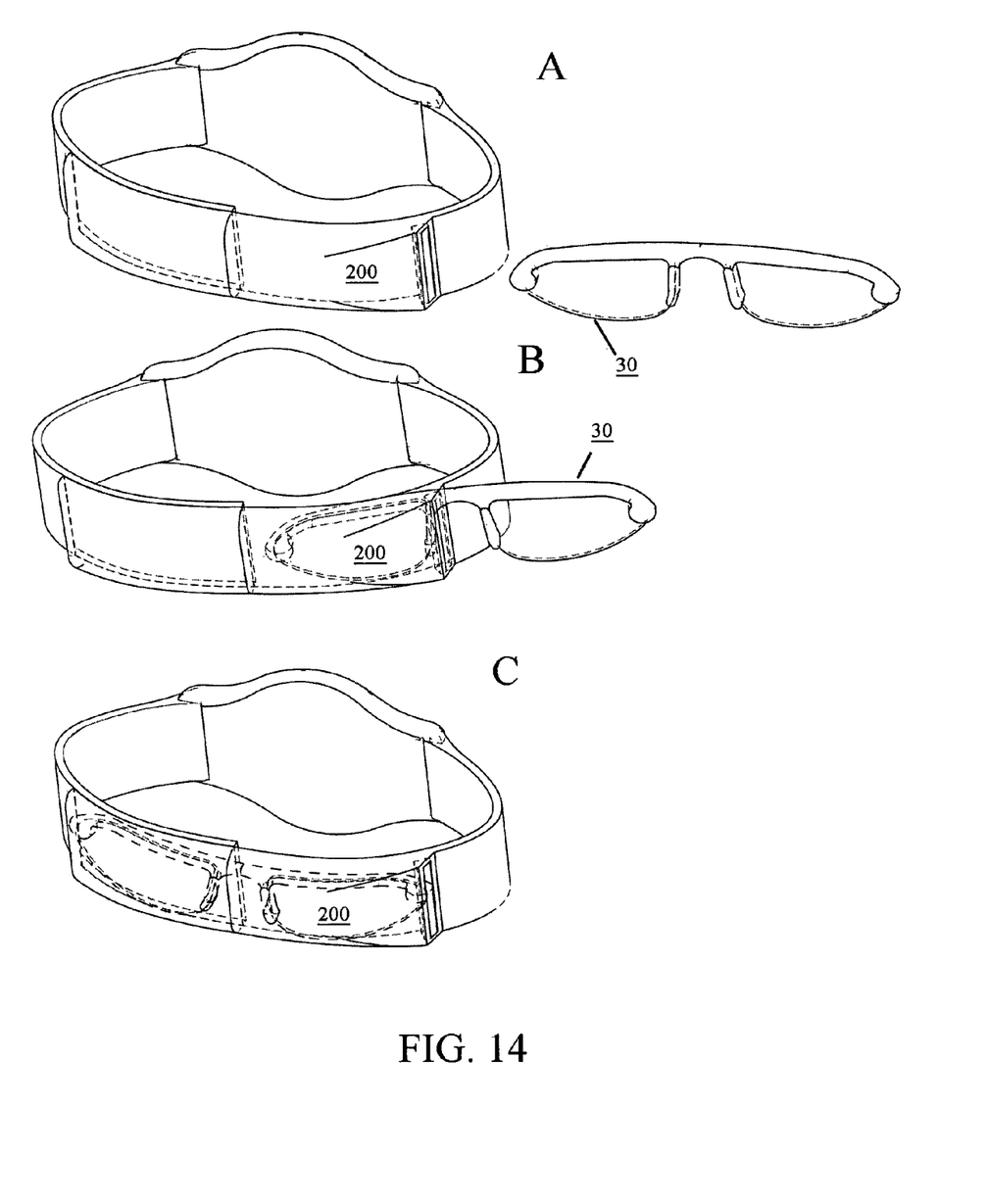
FIG. 14 is a perspective view illustrating insertion of the eyeglasses 30 into the envelope case 200 of FIGS. 12-13.

FIG. 14 illustrates the insertion sequence, at (A) showing the eyeglasses 30 outside the case 200, partially inserted at (B) and fully inserted at (C) in a curved configuration about the user's wrist. The eyeglasses 30 can be similarly removed, allowing them to be far more accessible to the user.

The slide-in envelope configuration of FIGS. 12-14 also lends itself to implementation as a flexible plastic or fabric sleeve, both for permanent or retrofit attachment to a watchband, wrist band or the like.

Figure 15:
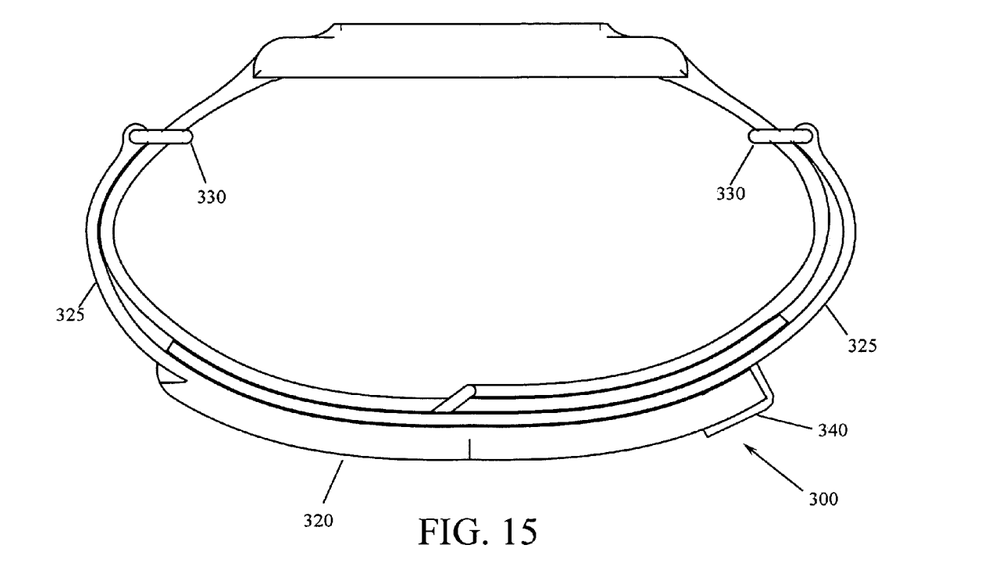
FIG. 15 is a side view of another embodiment of combination watchband eyeglasses incorporating a slide-in fabric envelope case 300.
Figure 16:
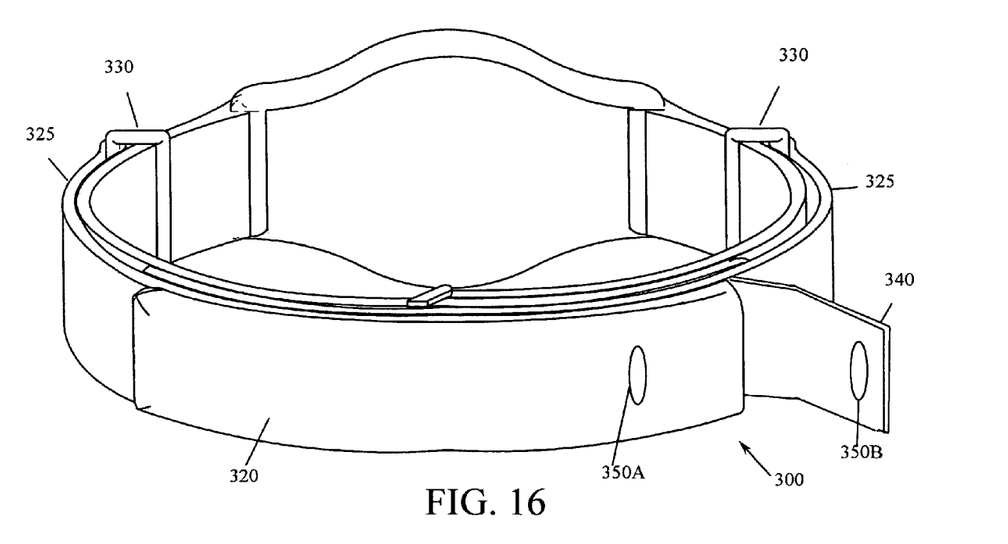
FIG. 16 is a rear perspective view of the combination watchband eyeglasses with slide-in fabric envelope case 300 as in FIG. 15.

For example, FIGS. 15-16 illustrate an embodiment of the combination watchband eyeglasses incorporating a slide-in fabric envelope case 300. In this embodiment the wrist-worn case 300 is designed for retrofit attachment to the existing strap of a watchband. The case 300 includes a protective fabric sleeve 320 formed as an elongate enclosure open at one end, and with (optionally) a foldover fabric flap 340 for covering the open end of sleeve 320. The inside surface of the foldover flap 340 may be provided with a hook-and-loop inset 350B for attachment to a cooperating inset 350A attached along the exterior of the sleeve 320. The fabric sleeve 320 is sewn or otherwise attached to one side of a section of flexible band 325 that extends outwardly at both ends of the sleeve 320. Both distal ends of the band 325 are equipped with attachment fixtures 330 for attachment to an existing watchband, bracelet, wrist band, or the like. In the illustrated embodiment, the attachment fixtures 330 are simple rectangular metal loops for passing the existing watchband through. However, other alternate attachment fixtures are considered within the scope and spirit of the present invention, including short segments of wrap-around straps sewn orthogonally to the distal ends of the band 350 for wrap-around snap-fit or hook-and-loop attachment to the existing watchband. The fabric envelope case 300 and flexible band 350 may be formed of woven cotton or poly fabric, or flexible rubber or plastic.

The above-described embodiment the wrist-worn case 300 may alternatively be adapted as an integral feature of a watchband, wristband or bracelet, simply by eliminating the band 325 and attachment fixtures 330 and by sewing, adhering or integrally molding the protective fabric sleeve 320 directly to the back of an otherwise conventional watchband, wristband or bracelet.

The eyeglasses 30 of FIGS. 15-16 are inserted in the same manner shown in FIG. 14.

In all of the foregoing embodiments the present invention comprises a combination of flexible low-profile and compact Pince-Nez reading glasses that pinch securely on the wearer's nose, and a wrist-worn case for housing the reading glasses when not in use, allows any individual to always carry a pair of reading glasses in a more convenient manner, and eliminates the possibility of being caught without a suitable vision aid.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. The combination of a pair of eyeglasses and a case for containing said eyeglasses, said pair of eyeglasses and case further comprising:
   a pair of eyeglasses formed of a flexible resilient material and adapted to flex from a substantially horizontal lengthwise form to an arcuate lengthwise form;
   a wrist-worn case for enclosing and containing said flexible eyeglasses while in said arcuate lengthwise form, said wrist-worn case including a band adapted to be worn about a user's wrist, and a storage compartment attached to said band for seating and securing said flexible eyeglasses, the storage compartment further comprising an arcuate backplate conforming to said user's wrist, a pair of opposing sidewalls protruding from said backplate, and an arcuate cover pivotally engaged at one end of said backplate and pivotable against said sidewalls to form an arcuate enclosure between said backplate, sidewalls and cover;
   whereby said flexible eyeglasses may be stored within said enclosure in said arcuate lengthwise form.

2. The combination of eyeglasses and case according to claim 1, wherein said flexible eyeglasses further comprise flexible Pince-Nez reading glasses for resting securely on the user's nose.

3. The combination of eyeglasses and case according to claim 2, wherein said flexible Pince-Nez reading glasses comprise a pair of lenses integrally attached to a flexible Pince-Nez frame.

4. The combination of eyeglasses and case according to claim 3, wherein said flexible Pince-Nez frame includes a recessed nose bridge.

5. The combination of eyeglasses and case according to claim 4, wherein the backplate of said storage compartment comprises at least one raised rib for seating within the recessed nose bridge of said flexible Pince-Nez frame.

6. The combination of eyeglasses and case according to claim 5, wherein the backplate of said storage compartment further comprises a receptacle positioned centrally of said at least one raised rib, and said pivoting cover includes an inwardly protruding detent prong for insertion into said receptacle and latching shut said cover.

7. The combination of eyeglasses and case according to claim 5, wherein the pivoting cover includes an underhook at one end for releasably latching against another end of said backplate and thereby maintaining said cover in a closed position.

8. The combination of eyeglasses and case according to claim 1, wherein said storage compartment is removable from said band.

9. The combination of eyeglasses and case according to claim 8, wherein said pair of opposing sidewalls extend past said backplate on both ends thereof to a pair of cross-beams each of which joins said sidewalls together, thereby forming an aperture at each end of said backplate bounded by said sidewalls, crossbeam and backplate, said aperture passing said band there through.

10. The combination of eyeglasses and case according to claim 1, wherein said backplate of the storage compartment is integrally molded to said band.

11. The combination of eyeglasses and case according to claim 10, wherein said band is an ornamental bracelet.

12. The combination of eyeglasses and case according to claim 1, wherein said band is adapted for attachment to a watch, and the storage compartment is positioned opposite said watch attachment for wearing against the underside of said user's wrist.

13. The combination of eyeglasses and case according to claim 1, wherein said arcuate cover is pivotally engaged to said backplate by a pivot pin straddling said sidewalls at one end of said backplate.

14. The combination of a pair of eyeglasses and a bracelet case for containing said eyeglasses, said pair of eyeglasses and bracelet case further comprising:
   a pair of eyeglasses formed of a flexible resilient material and adapted to flex from a substantially horizontal lengthwise form to an arcuate lengthwise form;
   a wrist-worn bracelet including an integral case for enclosing and containing said flexible eyeglasses while in said arcuate lengthwise form, said integral case of said wrist-worn bracelet comprising a storage compartment attached to said bracelet for seating and securing said flexible eyeglasses, the storage compartment being defined by an arcuate section of said bracelet conforming to said user's wrist, a pair of opposing sidewalls protruding from said bracelet, and an arcuate cover pivotally engaged at one end of said bracelet and pivotable against said sidewalls to form an arcuate enclosure between said bracelet, sidewalls and cover;
   whereby said flexible eyeglasses may be stored within said storage compartment in said arcuate lengthwise form.

15. The combination of eyeglasses and bracelet case according to claim 14, wherein said flexible eyeglasses further comprise flexible Pince-Nez reading glasses for resting securely on the user's nose.

16. The combination of eyeglasses and bracelet case according to claim 15, wherein said flexible Pince-Nez reading glasses comprise a pair of lenses integrally attached to a flexible Pince-Nez frame.

17. The combination of eyeglasses and case according to claim 16, wherein said flexible Pince-Nez frame includes a recessed nose bridge.

18. The combination of eyeglasses and case according to claim 17, wherein the bracelet at said storage compartment comprises at least one raised rib for seating within the recessed nose bridge of said flexible Pince-Nez frame.

19. The combination of eyeglasses and case according to claim 14, wherein the bracelet at said storage compartment further comprises a receptacle positioned centrally of said at least one raised rib, and said pivoting cover includes a latch for releasably latching closed against said bracelet.

20. A combination of a pair of eyeglasses, and a watchband for containing said eyeglasses, said pair of eyeglasses and watchband further comprising:
   a pair of eyeglasses formed of a flexible resilient material and adapted to flex from a substantially horizontal lengthwise form to an arcuate lengthwise form; and
   a watchband attachable to a watch and including an integral case opposing said watch for enclosing and containing said flexible eyeglasses in said arcuate lengthwise form, the integral case comprising a storage compartment defined by a section of said watchband, a pair of opposing sidewalls protruding from said watchband section, and an arcuate cover pivotally engaged at one end of said sidewalls and pivotable there against to form an arcuate enclosure between said watchband, sidewalls and cover;

whereby said flexible eyeglasses may be stored within said integral case in said arcuate lengthwise form.

21. The combination of eyeglasses and watchband according to claim 20, wherein said flexible eyeglasses further comprise flexible Pince-Nez reading glasses having a nose bridge for resting securely on a user's nose.

22. A combination of a pair of eyeglasses, and a wrist and/or watchband case for containing said eyeglasses, said pair of eyeglasses and wrist worn case further comprising:
- a pair of eyeglasses formed of a flexible resilient material adapted to flex from a substantially horizontal lengthwise form to an arcuate lengthwise form; and
- a flexible enclosure defined as an open-ended sleeve for lengthwise attachment to a wrist and/or watchband for enclosing and containing said flexible eyeglasses in said arcuate lengthwise form about a user's wrist.

23. The combination of eyeglasses and case according to claim 22, wherein said wrist-worn case includes an elongate flexible sleeve attached lengthwise to a band section extending outward on both sides of said sleeve, and an attachment fixture secured distally at one end of said band section, whereby said band section attaches via said attachment fixture to a second opposing band section having a cooperating attachment fixture to secure watchband onto the user's wrist.

24. The combination of eyeglasses and case according to claim 22, wherein said wrist-worn case includes an elongate sleeve attached directly to one strap of an existing watchband, wristband or bracelet.

25. The combination of eyeglasses and case according to claim 22, wherein said wrist-worn case includes an elongate flexible sleeve with an opening at one end and a foldover flap for selectively covering said opening.

26. The combination of eyeglasses and case according to claim 25, wherein said elongate flexible sleeve is formed of fabric.

27. The combination of eyeglasses and case according to claim 22, wherein said flexible eyeglasses further comprise flexible Pince-Nez reading glasses including a pair of lenses integrally affixed to a flexible frame for resting securely on the user's nose.

* * * * *